C. KREBS
REPRODUCING MECHANISM
Nov. 24, 1931.
Original Filed June 25, 1928
Re. 18,259
3 Sheets-Sheet 1
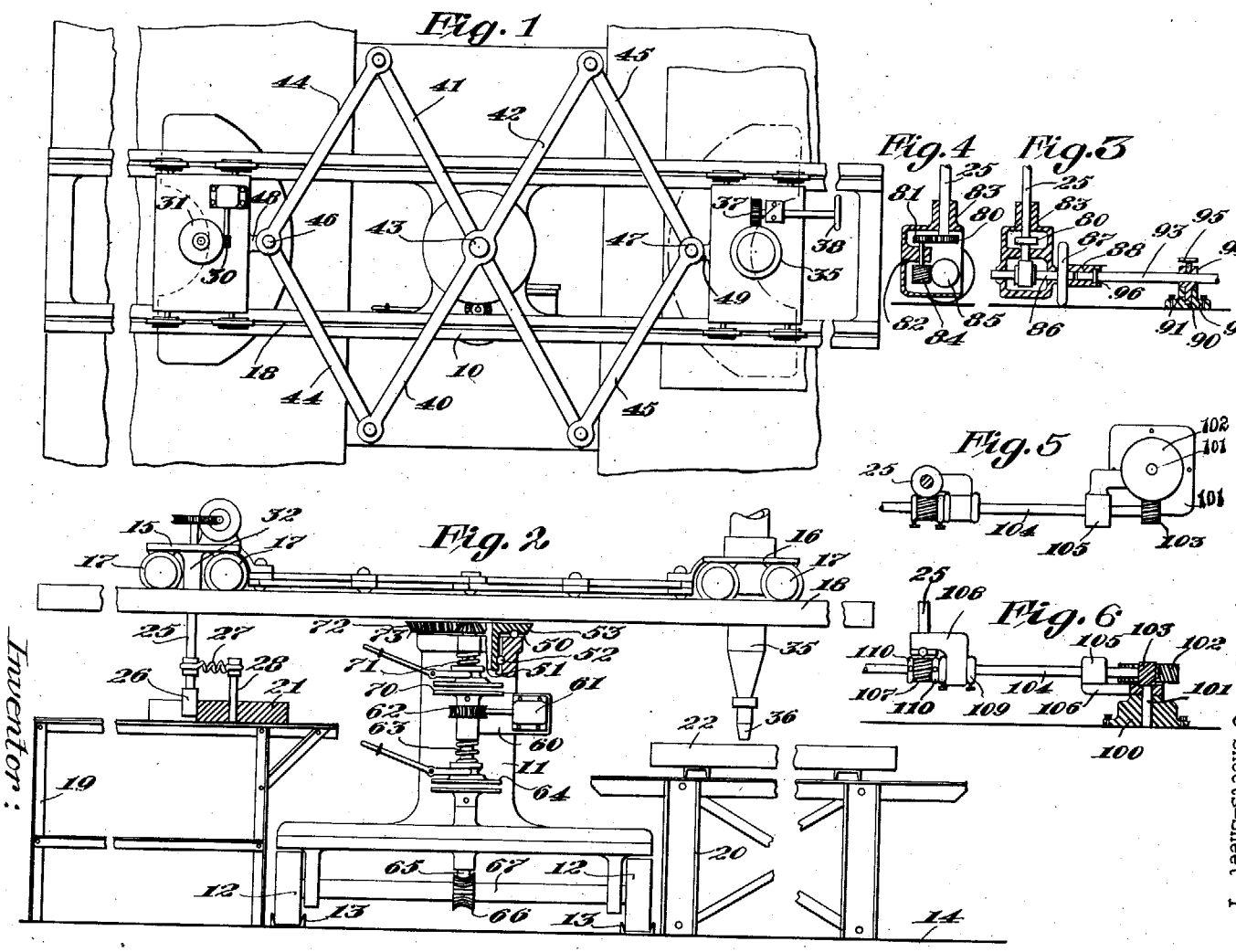
Inventor:
Carlos Krebs
By Roberts Cushman & Woodberry
Att'ys.

C. KREBS
REPRODUCING MECHANISM
Nov. 24, 1931.
Re. 18,259
Original Filed June 25, 1928. 3 Sheets-Sheet 2
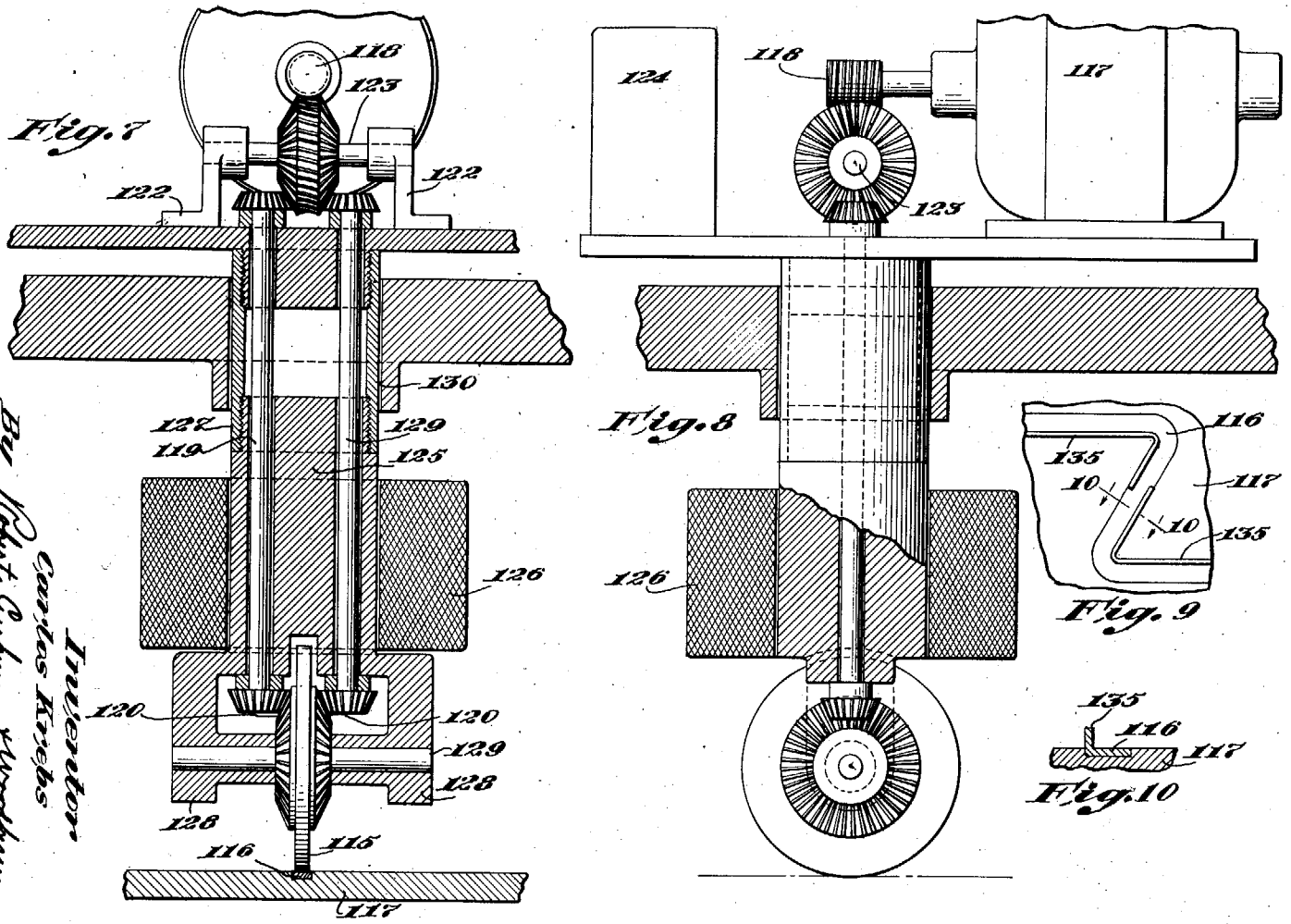
Inventor
Carlos Krebs
By Roberts Cushman & Woodbury
Att'ys.

C. KREBS
REPRODUCING MECHANISM
Nov. 24, 1931.
Original Filed June 25, 1928
Re. 18,259
3 Sheets-Sheet 3
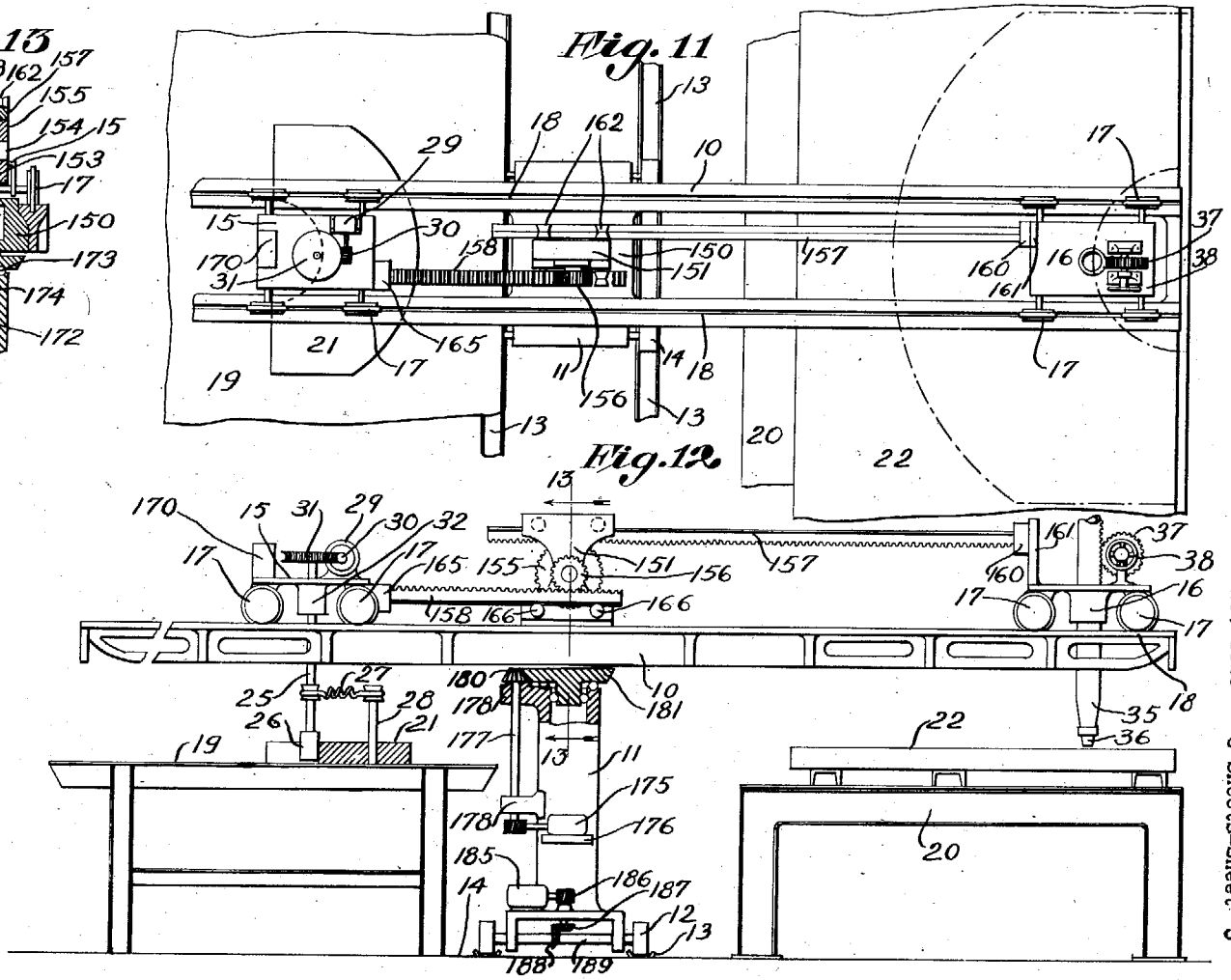
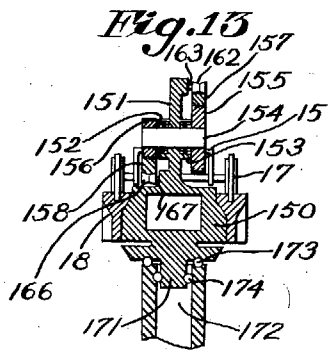
Inventor:
Carlos Krebs
by Roberts Cushman & Woodberry
Attys.

Reissued Nov. 24, 1931 Re. 18,259

UNITED STATES PATENT OFFICE

CARLOS KREBS, OF BOSTON, MASSACHUSETTS

REPRODUCING MECHANISM

Original No. 1,763,793, dated June 17, 1930, Serial No. 283,023, filed June 25, 1928. Application for reissue filed July 6, 1931. Serial No. 548,995.

This application is a continuation in part of my application, Serial No. 275,545, filed May 5, 1928, and relates to an improvement in reproducing mechanism which may be employed in various machines as for example in torch cutting machines.

The primary object of this invention is to provide means for controlling the reproductive movements of a tool or other element used in cutting, welding, profiling and other machinery with either directly or indirectly controlled drives.

One application of this invention is in a torch cutting machine of the type in which the movement of the torch reproduces the movement of a tracer guided by a suitably formed pattern or template whereby the torch is adapted to cut from the material an article which corresponds in every particular to the pattern. Certain torch cutting machines of this type previously known are open to the objection that it is difficult to inspect the work in progress due to the relationship of the tracer and torch, and in order to avoid this difficulty it has been suggested that the movement of the tracer be transmitted to the torch through a linkage connection by which the torch is supported. Such machines, while operating satisfactorily at first, soon become unsatisfactory due to the fact that not only is the weight of the torch supported by the linkage connection, but the effective weight of the torch changes with its changes in position, thus placing a strain upon the linkage connection which quickly impairs the accurate transmission of movement therethrough.

One specific application of this invention to a torch cutting machine as herein shown and described consists briefly in providing carriages for the torch and the tracer, and a kinetic connection between the carriages, the carriages being at a predetermined relative distance from the central support of a platform on which the carriages rest, the weights of each carriage with its associated elements being such so that the platform is in balance at all times and in providing means for cutting arcs or curves or for performing translatory operations when desired.

Thus in one of the embodiments described hereinbelow the carriages are kept at all times equidistant from the central support and the weights of each carriage with its associated elements are the same while in another embodiment the torch carriage is at all times twice as far from the central support as is the tracer carriage and the weight of the tracer carriage and its associated elements is twice that of the torch carriage and its associated parts. The second embodiment may be designated as having a one to two ratio of movement. In place of these embodiments other embodiments having other ratio of movement may be employed when desired. Obviously, however, if the platform is to be kept in balance the weight of the tracer members must bear the same relation to the weight of the torch members as the movement of the latter bears to the movement of the former.

In the following specification are set forth two embodiments of this invention as applied to a torch cutting machine whereby the objects above described may be attained, but it will be understood that this particular disclosure is merely illustrative and not limitative.

In the drawings which form a part of the specification—

Fig. 1 is a plan view of one embodiment of a torch cutting machine in which the movement of the tracer is controlled by a pattern or template and transmitted to the torch through a kinetic connection of the pantograph type;

Fig. 2 is a side elevation with parts in section of such machine;

Figs. 3 and 4 illustrate means cooperating with the tracer whereby the torch is caused to cut a circle;

Figs. 5 and 6 illustrate other means for cooperating with the tracer for causing the torch to cut a circle;

Fig. 7 is an enlarged side elevation partly in section of magnetic means which may be employed to control the movement of the torch;

Fig 8 is an end view of the means shown in Fig. 7;

Fig. 9 is a plan view of one form of the template strip which may be employed as part of such magnetic means;

Fig. 10 is a sectional view along the line 10—10 of Fig. 9.

Fig. 11 is a plan view similar to Fig. 1 of another embodiment of a torch cutting machine in which the movement of the torch is transmitted from the tracer through a kinetic connection of the rack and pinion type;

Fig. 12 is a side elevation partly in section of the machine shown in Fig. 11; and Fig. 13 is a sectional view taken along the lines 13—13 on Fig. 12.

The machine disclosed in Figs. 1 and 2 comprises generally a platform 10 suitably supported at its center upon a pedestal 11 provided with wheels 12 which engage in tracks 13 which may be secured to a floor or platform 14. Mounted to reciprocate longitudinally upon the platform 10 are a tracer carriage 15 and a torch carriage 16. Each of these carriages is provided with rollers 17 which are guided by tracks 18 on the platform 10. On each side of the pedestal 11 are mounted tables 19 and 20, the table 19 acting to support a template or pattern 21 and the table 20 acting to support the work 22.

Depending from the tracer carriage 15 between the tracks 18 is a tracer 25 having at its lower end a roller 26 held in contact with the edge of the template 21 by a spring 27 secured to a suitably located post 28. The tracer 25 is caused to rotate by a motor 29 through gears 30 and 31. A sleeve 32 depending from the carriage 15 guides the tracer 25 and permits its free rotation under the action of the motor 29.

The torch carriage 16 supports a torch 35 which depends between the tracks 18 in a manner similar to the tracer 25. The tip 36 of the torch is fixed at the proper position relative to the work 22 by means of a gear 37 and a hand wheel 38. The carriages 15 and 16 are connected by a pantograph or "lazy-tongs" 40 which comprise a pair of crossed bars 41, 42 pivoted at their center on a pin 43 carried by the platform 10. The bars 41, 42 are connected to the carriages by links 44 and 45 pivotally secured to the ends of the bars and having pivotal connections 46, 47 with arms 48, 49 projecting from the carriages 15 and 16 respectively. The platform 10 is mounted to rotate independently of the pedestal 11 by means of a flanged cup 50 which enters a circular recess 51 in the upper end of the pedestal 11. Suitable bearings 52 are provided between the cup and the wall of the recess 51 and between the flange 53 and the upper end of the pedestal 11 whereby the weight of the platform 10 and the carriages is supported by the bearings 52 which permit the free rotation of the platform and the elements carried thereby relative to the pedestal 11.

Thus, as the tracer 25 is rotated by the motor 29, the roller 26 will follow the outline of the template 21 and the carriage 15 of the tracer reciprocate relative to the central support of the platform. The torch carriage 16 by means of the pantograph 40 is caused to move relative to the central support in the direction opposite to that of the tracer carriage 15. Moreover the tracer 25 causes the platform 10 with the torch 35 to swing on the pedestal 11 so that every movement of the tracer 25 is duplicated by the torch 35 in the reverse direction.

The movement of the torch carriage 16 is the same as the movement of the tracer carriage 15 in the embodiment illustrated in Figs. 1 and 2. In other words the ratio of movement is one to one. This follows from the fact that bars 41, 42 are pivoted at the center. However if a different ratio of movement is desired the pivot point would be shifted. This is a well known characteristic of the pantograph and although it is not illustrated in the drawings it will be understood that such an arrangement is within the spirit and scope of the invention. Suitably arranged weights may be mounted upon the carriages so that the moving of the carriages will not disturb the balance of the platform 10 with regard to the pedestal 11.

The construction thus described may be employed when it is desired that the movement of the torch be controlled by a template which is relatively small so that a slight rotation of the platform 10 will give all the lateral movement necessary for the torch and tracer in which case the wheels 12 are blocked so that the pedestal has no movement. However, when the template is of considerable dimension laterally the platform and carriages must be moved bodily in a lateral direction. In order to accomplish this movement of the tracer and the corresponding movement of the torch the pedestal 11 may be caused to travel in the tracks 13. This movement of the pedestal may be given in any desired manner, as for example by the means of a motor 61 mounted upon a suitable bracket 60 on the pedestal 11 which motor, through gearing 62 causes the rotation of a stub shaft 63. By a suitable clutch 64 this rotation of the shaft 63 is transmitted to a shaft 65 which through gearing 66 causes a rotation of the axle 67 on which the wheels 12 are mounted. The pedestal 11 together with the platform 10, the carriages, 15, 16 and all the associated parts are thus given in addition to the movement which results from the contact of the tracer with the template a translatory movement so that the tracer can follow the outline of the template regardless of its lateral dimensions.

Furthermore conditions often arise wherein it is necessary that the platform with the carriages be positively rotated so that the torch 35 will cut a circle with the center line of the pedestal 11 as a center. In order to attain this movement of the platform the carriage 16 is fixed at a predetermined distance from the center line of the pedestal by any suitable means. The wheels 12 are blocked, the tracer 25 is raised, the clutch 64 is thrown into the idle position shown in Fig. 2 and the movement of the shaft 63 is transmitted by a clutch 70 to a shaft 71 having at its upper end a bevel gear 72 which meshes with teeth 73 on the outer edge of the flange 53.

The embodiment shown in Figs. 11, 12 and 13 is similar in many respects to that shown in Figs. 1 and 2. Accordingly, the same reference numerals have been applied wherever possible and no description is believed to be necessary regarding the common features. The tracer carriages 15 and 16 function in the same manner in this embodiment as they did in the previously described embodiment, but the motion of the tracer carriage is transmitted to the torch carriage by a kinetic connection, which may be briefly described as of the rack and pinion type.

Supported upon and connecting the tracks 18 of the platform 10 is a block 150 having a plate 151 extending upwardly at right angles to the tracks and spaced equally therefrom. The plate 151 is shown in the drawings as integral with the block 150, but it could obviously be separate therefrom if desired. Extending through the plate 151 and pivotally supported on bearings 152 carried by flanges 153 on the plate 151 is a shaft 154 which carries on one end a pinion 155, and on the other end a pinion 156. These pinions are pinned, or otherwise suitably secured, to the shaft, so that the shaft and pinions rotate simultaneously under all conditions. As here shown, the diameter of the pinion 155 is double that of the pinion 156 but the diameters might be the same or might vary in other proportions.

Meshing with the pinions 155 and 156 are rack bars 157, 158 attached to the torch and tracer carriages respectively. The rack bar 157, which meshes with the pinion 155, is rigidly secured to a boss 160 on an upstanding bracket 161 carried by the torch carriage 16. The rack bar 157 normally rests by gravity against the pinion 155, but in order to prevent any separation of the bar and pinion, hour glass rollers 162 are provided which turn freely on pins 163 carried by the plate 151. The upper surface of the rack bar 157 is made convex complementing the conformation of the rollers 162 so that the rollers act not only to hold the rack bar in mesh with the teeth of the pinion but also to prevent any lateral shifting of the bar which might occur under certain conditions. The rack bar 158 is secured in a boss 165 carried by the tracer carriage 15, and is held in mesh with the teeth of the pinion 156 by hour glass rollers 166 carried on pins 167 projecting outwardly from the base of the plate 151. The lower face of the rack bar 158 is preferably made convex so that the rollers 166 act not only to hold the bar in meshing relation with the teeth on the pinion 156, but also to prevent any lateral shifting of the bar.

The bar 157 in this particular embodiment is made double the length of the bar 158, and, since the pinion 155 has a diameter double that of the pinion 156, it must follow that the torch carriage 16 is moved by the bars 157, 158 and pinions 155, 156 twice as fast and twice as far as the tracer carriage 15. In other words, each movement of the tracer carriage 15 under the impulse of the tracer 25 and the template 21 will cause, through the kinetic connection just described, a movement of the torch carriage 16 of double the length. Obviously, therefore, the torch 35 will reproduce on the work 22 a figure double in dimensions the template 21. Since, from the construction thus described, the torch carriage 16 is at all times twice as far from the center of the platform 10 as is the tracer carriage 15, suitable balancing means are provided to make the ends of the platform 10 with reference to the pivotal center, as defined by the pedestal 11, equal in weight. This may be done by mounting a single weight 170 of the proper size on the tracer carriage 15 or by mounting on both carriages 15 and 16 weights of the proper size.

The platform 10 is mounted to rotate relative to the pedestal 11 by means of a cylindrical pin 171 projecting downwardly from the block 150 and entering the central recess 172 in the pedestal 11 which, as is clearly shown in Figs. 12 and 13, is tubular. Suitable load and thrust bearings 173, 174, are provided to insure the free rotation of the platform 10, and the elements carried thereby relative to the pedestal 11. The platform 10 turns freely on the pedestal but may be positively rotated if desired, by means of a motor 175 mounted on a shelf 176 and rotating through suitable gears 177, a shaft 178 carried by brackets 179 projecting from the pedestal 11. The shaft 178 has, at its upper end, a beveled gear 180, which meshes with a suitably formed ring of teeth 181 which may be integral with the block 150, as shown in the drawings. Thus, by means of the motor 175, the platform 10 is caused to rotate on its central support so that the torch 35 cuts an arc on the work carried by the table 20.

As previously pointed out, conditions sometimes arise in which it is necessary that the platform be given, in addition to or instead of the motion of rotation, a motion in a lateral direction, as for example along the tracks 13. This motion is controlled in the present embodiment by a motor 184 mounted on the base of the pedestal which by means of gearing 185 actuates a vertical shaft 186. The shaft 186 carries at its lower end a beveled gear 187 which meshes with a beveled gear 188 on the axle 189 of the wheels 12. The motor 184 when actuated will cause the pedestal 11 and the platform 10 to travel in a lateral direction over the tracks 13.

The machines just described may also be employed for cutting circles by substituting for the template 21 the means shown in Figs. 3 and 4 or 5 and 6. In the Figs. 3 and 4 construction the roller 26 is removed from the shaft of the tracer 25 and a gear 80 substituted therefor. This gear meshes with a gear 81 carried by a shaft 82 in a housing 83. Mounted upon the shaft 82 at its lower end is a gear 84 which meshes with a gear 85 carried by a shaft 86 suitably supported at each end in the housing 83. Fixed upon the shaft 86 outside the housing 83 is a roller 87. The end of the shaft 86 beyond the roller 87 is supported in a sleeve 88 mounted on a projection 89 from the housing 83. The movement of the housing 83 is controlled by a pivot 90 which rotates freely in a socket 91 of a block 92 suitably fixed in position. The pivot 90 is connected to the housing 83 by means of a rod 93 one end of which enters the sleeve 88 and is fixed therein by a pin 94, while the other end is passed through and adjustably secured in a passage 94 of the pivot 90 by a set screw 95. The rotation of the tracer 25 by the motor 29 thus causes the housing 83 to swing around the block 92 in a circle, the diameter of which is determined by the rod 93. This movement of the tracer is transmitted to the tracer carriage 15 and thence, through the kinetic connections previously described, to the torch carriage 16.

In place of the construction shown in Figs. 3 and 4 the tracer may be caused to turn in a circle by means shown in Figs. 5 and 6 in which the center of the circle is determined by a block 100 in which is mounted a pin 101 carrying a gear 102 at its upper end. In mesh with the gear 102 is a gear 103 carried at one end of a shaft 104 which passes through a bearing 105 provided in an arm 106 carried by the block 100. The tracer shaft 25 is provided with a gear which meshes with a gear 107 keyed to rotate with and slidable along the shaft 104. The tracer shaft 25 passes through a bracket 108 supported by the shaft 104. The position of the bracket 108 on the shaft 104 is determined by the sleeves 109 and the position of the gear 107 on the shaft is fixed by the sleeves 110. The pin 101 is at the center of the circle to be followed by the tracer 25 and the diameter of the circle is determined by the distance from the pin to the tracer 25. The sleeves 109 and 110 position the gear 107 on the shaft and, through the bracket 108, position the tracer 25. The rotation of the tracer 25 by the motor 29 causes the reciprocation of the carriage 15 and the consequent and complementary reciprocation of the carriage 16.

Figs. 7, 8, 9 and 10 illustrate magnetic means for controlling the movement of the tracer carriage 15 and thus through the kinetic connection the movement of the torch carriage 16. Mounted upon the tracer carriage 15 is a magnetic wheel drive comprising a wheel 115 guided by a narrow-metal strip 116 which is embedded in a non-magnetic plate 117 and acts as a pattern template. The wheel 115 is driven by a motor 117 through gearing 118, shafts 119 and gearing 120. The motor 117 is mounted upon a rotatable platform 121 and the wheel 115 together with the gearing is supported on that platform by a pair of brackets 122 and a shaft 123, as shown, particularly in Fig. 7. In order to counterbalance the weight of the motor 117 on the platform 121 there is mounted upon the platform 121 a weight 124. The wheel 115 is supported by an iron core piece 125 magnetized by a suitably energized coil 126 and suspended from the table 121 by a non-magnetic sleeve 127. The iron piece 125 terminates in forks 128 at either side of the wheel 115 through which forks is passed a rod 129 on which the wheel 115 and its gears are rotatably supported. The sleeve 127 passes through a central opening 130 in the carriage 15 and the table 121 is spaced a sufficient distance above the carriage so that the wheel 115 is held in contact with the strip 116 by the weight of the mechanism just described and is free to rotate relatively to the carriage. The wheel 115 is held in contact with the strip 116 not only by the force of gravity but also by the magnetic attraction due to the action of the coil 126. The wheel 115 is rotated by the motor 117 and due to the magnetic attraction the wheel will travel over the strip 116 and the entire unit will cause the carriage 15 to move therewith. The strip 116 preferably is provided at the turns with flanges 135 on the inner edges as shown particularly in Figs. 9 and 10. The flanges 135 at the corners increase the amount of metal at the turns and thus provide an additional attraction to the wheel 115 causing it to follow closely the line of the strip 116. The movement of the tracer carriage 15 is transmitted by the linkage connection to the torch carriage 16.

The work 22 is here shown as supported upon the table 20 and the pedestal as resting upon a platform below the work. However it will be understood that in many instances the table 20 will be omitted and the pedestal will rest directly upon the metal being treated.

While this invention has been specifically shown and described in connection with the cutting of metal by means of a thermal instrumentality such for example as oxyhydrogen or oxy-acetylene blow torch, or an electric arc, its application is by no means limited to this use, and it will be understood that it may be employed for guiding reproductive movements of any kind regardless of the function of the element controlled thereby. Moreover, while two forms of kinetic connection have been herein specifically shown and described, I am not limited thereto since other forms might be employed without departing from the spirit and scope of this invention as set forth in the following claims.

I claim:

1. A machine adapted for the control of a thermal metal-working tool as in cutting or welding, comprising a platform having a support intermediate its ends, parallel tracks on said platform one track on each side of and equidistant from said support, a tracer carriage and a tool carriage carried by and reciprocable over said tracks, and means for maintaining said carriages at a predetermined relative distance from said support at all times.

2. A metal-working machine comprising a platform having a support intermediate its ends, carriages carried by and movable over said platform in opposite directions, means joining said carriages for maintaining them at all times at a predetermined relative distance from said support, a tracer associated with and adapted to control the movement of one of said carriages, and a thermal metal-melting instrumentality associated with the other of said carriages.

3. A torch cutting machine comprising a platform having a support intermediate its ends, a tracer carriage and a torch carriage carried by and movable over said platform and means for maintaining said carriages at a predetermined relative distance from the platform support at all times.

4. A machine adapted for the control of a thermal metal-working tool as in cutting or welding, comprising a platform having a support intermediate its ends on which the platform is pivotally mounted, a tracer carriage and a tool carriage carried by and movable over said platform, means for maintaining said carriages at a predetermined relative distance from the platform support at all times, and means for rotating said platform upon said support.

5. A machine adapted for the control of a thermal metal-working tool as in cutting or welding, comprising a platform mounted to rotate about a vertical axis, a pair of parallel tracks on said platform, the axis being midway between said tracks, a tracer carriage and a tool carriage carried by and reciprocable over said tracks, and means for rotating said platform about said axis.

6. A machine adapted for the control of a thermal metal-working tool as in cutting or welding, comprising a platform mounted to rotate about a vertical axis, a pair of parallel tracks on said platform, the axis being midway between said tracks, a tracer carriage and a tool carriage carried by and reciprocable over said tracks, and means for reciprocating said platform in a direction at right angles to said axis.

7. A machine adapted for the control of a thermal metal-working tool as in cutting or welding, comprising a longitudinally extending platform, a pedestal intermediate the ends thereof upon which said platform is supported and relative to which said platform is rotatable, a tracer carriage and a tool carriage carried by and movable over said platform at opposite sides of said pedestal, and means for maintaining said carriages at a predetermined relative distance from said center.

8. A machine adapted for the control of a thermal metal-working tool as in cutting or welding, comprising a longitudinally extending platform, a pedestal intermediate the ends thereof upon which said platform is supported and relative to which said platform is rotatable, a tracer carriage and a tool carriage carried by and movable over said platform at opposite sides of said pedestal, and means for maintaining said carriages at a predetermined relative distance from said center, said means consisting of a plurality of bars secured to said carriages and to said platform at its center.

9. A machine adapted for the control of a thermal metal-working tool as in cutting or welding, comprising a tracer carriage, a tool carriage, a platform by which said carriages are carried and over which said carriages travel, and means whereby said carriages counterbalance said platform at all times during the operation of said machine.

10. A machine adapted for the control of a thermal metal-working tool as in cutting or welding, comprising a tracer carriage, a tool carriage, a platform by which said carriages are carried, and means whereby said carriages counterbalance said platform at all times during the operation of said machine, and means for rotating said platform with said carriages.

11. A machine adapted for the control of a thermal metal-working tool as in cutting or welding, comprising a tracer carriage, a tool carriage, a platform by which said carriages are carried, and means whereby said carriages counterbalance said platform at all times during the operation of said machine, means for reciprocating said carriages in opposite directions over said platform, and means for reciprocating said platform in a direction transverse to the direction of movement of said carriages.

12. In a torch cutting machine, a carriage, a tracer supported by said carriage, means for rotating said tracer, a template, means for holding said tracer in functional engagement with said template, a second carriage, a torch supported by said second carriage in position to operate upon the work, means connecting said carriages whereby the torch travels over the work in a path the reverse of the path traveled by the tracer, and means supporting the carriages independent of the connecting means.

13. A machine adapted for the control of a thermal metal-working tool as in cutting or welding, comprising a platform, a tracer carriage and a tool carriage supported by and movable over said platform, a template guiding the movement of the tracer carriage and a rack and pinion kinetic connection between said carriages causing said tool carriage to move in a direction opposite to that of the tracer carriage.

14. A machine adapted for the control of a thermal metal-working tool as in cutting or welding, comprising a platform, a block mounted on said platform intermediate its ends, a tracer carriage and a tool carriage supported by and movable over said platform the carriages being on opposite sides of the block and independent thereof, a template guiding the movement of the tracer carriage and a rack and pinion kinetic connection between said carriages causing said torch carriage to move in a direction opposite to that of the tracer carriage, said kinetic connection including a shaft freely rotatable in the block, pinions at each end of the shaft, and racks attached to said carriages and meshing with said pinions.

15. A metal-working machine comprising a track, a thermal metal-working instrumentally movable along said track, a tracer spaced from said thermal instrumentality longitudinally of said track and movable along said track, and linkage extending longitudinally of said track between said thermal instrumentality and said tracer for causing said thermal instrumentality to move along said track simultaneously with said tracer, said track supporting the thermal instrumentality independent of said linkage.

16. A metal-working machine comprising a track, a thermal metal-working instrumentality movable along said track, a tracer spaced from said thermal instrumentality longitudinally of said track and movable along said track, and linkage extending longitudinally of said track between said thermal instrumentality and said tracer for causing said thermal instrumentality to move along said track simultaneously with said tracer, said track supporting the tracer independent of said linkage.

Signed by me at Boston, Massachusetts, this 29th day of June, 1931.

CARLOS KREBS.